US012634005B2

(12) United States Patent
Nakada

(10) Patent No.: US 12,634,005 B2
(45) Date of Patent: May 19, 2026

(54) OPTICAL CONTROL DEVICE, OPTICAL TRANSMISSION DEVICE, AND SIGNAL LIGHT SETTING METHOD

(71) Applicant: NEC Corporation, Tokyo (JP)

(72) Inventor: Tatsuhiro Nakada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 18/383,264

(22) Filed: Oct. 24, 2023

(65) Prior Publication Data

US 2024/0154691 A1 May 9, 2024

(30) Foreign Application Priority Data

Nov. 9, 2022 (JP) ................................. 2022-179513

(51) Int. Cl.
H04B 10/08 (2006.01)
H04B 10/073 (2013.01)
H04J 14/02 (2006.01)
(52) U.S. Cl.
CPC ........ H04B 10/073 (2013.01); H04J 14/0241 (2013.01)
(58) Field of Classification Search
CPC .............. H04B 10/073; H04B 10/0795; H04B 10/075; H04B 10/40; H04B 10/07; H04B 10/0771; H04B 10/0791; H04B 10/80; H04B 10/0773; H04B 10/071; H04J 14/0241; H04J 14/02; H04J 14/0272

USPC ........ 398/16, 33, 38, 25, 26, 27, 30, 31, 32, 398/10, 13, 17, 20, 104, 105, 79, 173, 398/174, 175, 176, 177, 181
See application file for complete search history.

(56) References Cited

U.S. PATENT DOCUMENTS 7,103,275 B2 * 9/2006 Fujiwara ............ H04B 10/0771
                                                           398/31
7,437,070 B2 * 10/2008 Fujieda .............. H04B 10/0777
                                                           398/174

FOREIGN PATENT DOCUMENTS

JP          2009-212778 A     9/2009
JP          2014-060612 A     4/2014

* cited by examiner

*Primary Examiner* — Hanh Phan
(74) *Attorney, Agent, or Firm* — Sughrue Mion, PLLC

(57) ABSTRACT

A burden for configurating optical transmission equipment is increased as capacity in an optical transmission system is increased. An optical control device according to the present invention includes a storage means for storing transmission characteristics information in advance, the transmission characteristics information relating to an optical transmission system that transmits signal light via an optical transmission line, a first connection means for receiving the signal light and test light having a wavelength different from that of the signal light, an optical modulation means for modulating the test light by using the transmission characteristics information, and generating test modulation light, and a second connection means for delivering the test modulation light.

10 Claims, 10 Drawing Sheets

OPTICAL CONTROL DEVICE, OPTICAL TRANSMISSION DEVICE, AND SIGNAL LIGHT SETTING METHOD

This application is based upon and claims the benefit of priority from Japanese Patent Application No. 2022-179513, filed on Nov. 9, 2022, the disclosure of which is incorporated herein in its entirety by reference.

TECHNICAL FIELD

The present invention relates to an optical control device, an optical transmission device, and a signal light setting method, and more particularly to an optical control device, an optical transmission device, and a signal light setting method that are used in an optical transmission system.

BACKGROUND ART

In recent years, with advancement and diversification of information and communication services, there has been a demand for larger capacity in an optical transmission system. Consequently, the optical transmission system adopts a wavelength division multiplexing (WDM) technique that achieves larger transmission capacity per fiber (for example, see Japanese Unexamined Patent Application Publication No. 2014-060612 and Japanese Unexamined Patent Application Publication No. 2009-212778).

Further, in a long-distance optical transmission system such as a submarine cable system, it is required to optimize optical transmission equipment individually according to a transmission distance or characteristics of an optical fiber in order to secure a gain required for long-distance transmission.

SUMMARY

An object of the present invention is to provide an optical control device, an optical transmission device, and a signal light setting method that solve the above-mentioned problem of an increased burden for configurating optical transmission equipment as capacity in an optical transmission system is increased.

BRIEF DESCRIPTION OF THE DRAWINGS

Exemplary features and advantages of the present invention will become apparent from the following detailed description when taken with the accompanying drawings in which.

EXAMPLE EMBODIMENT

With reference to the drawings, example embodiments of the present invention are described below.

First Example Embodiment

Figure 1:
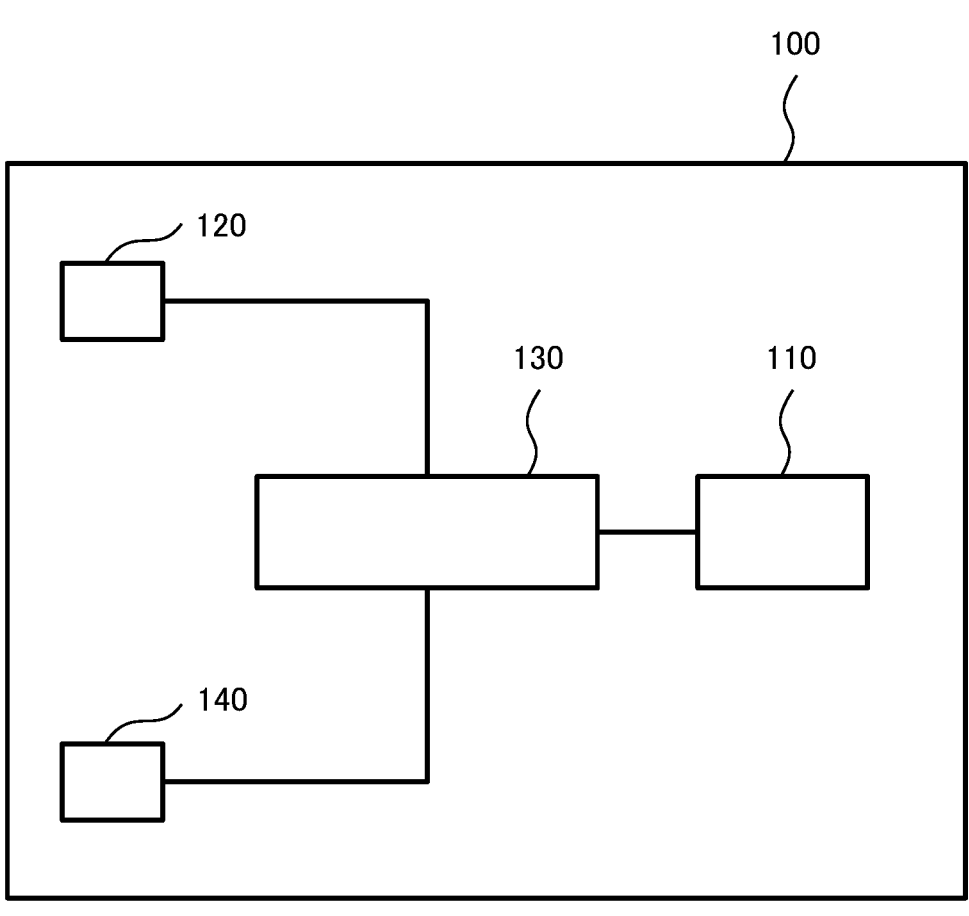
FIG. 1 is a block diagram illustrating a configuration of an optical control device according to a first example embodiment of the present invention.

FIG. 1 is a block diagram illustrating a configuration of an optical control device 100 according to the first example embodiment of the present invention. The optical control device 100 includes a storage unit (storage means) 110, a first connection unit (first connection means) 120, an optical modulation unit (optical modulation means) 130, and a second connection unit (second connection means) 140. The optical control device 100 is suitably used in an optical transmission system such as a submarine optical transmission system.

The storage unit 110 is configured to store transmission characteristics information in advance, the transmission characteristics information relating to an optical transmission system that transmits signal light via an optical transmission line. The first connection unit 120 is configured to receive signal light and test light having a wavelength different from that of the signal light. The optical modulation unit 130 is configured to modulate the test light by using the transmission characteristics information and generate test modulation light. Further, the second connection unit 140 is configured to transmit the test modulation light.

In this manner, the optical control device 100 is configured to modulate the test light by using the transmission characteristics information relating to the optical transmission system and generate the test modulation light, and deliver the test modulation light. Thus, configuration associated with the transmission characteristics information may be performed for optical transmission equipment constituting the optical transmission system by using the transmission characteristics information. Therefore, it is not required for a maintenance person to manually perform configuration for optical transmission equipment. In other words, the optical control device 100 of the present example embodiment can reduce a burden for configurating optical transmission equipment in an optical transmission system.

Here, the optical modulation unit 130 may have a configuration that includes an optical modulator that superposes the transmission characteristics information on the test light by subjecting the test light to intensity modulation.

As the storage unit 110, a semi-conductor memory may generally be used. Further, the first connection unit 120 in an optical input port, and the second connection unit 140 is an optical output port.

The transmission characteristics information includes at least one of a wavelength allocated to the first connection unit 120, a usable band allocated to the first connection unit 120, and a type of the optical transmission line, and a transmission distance of the optical transmission line.

Figure 2:
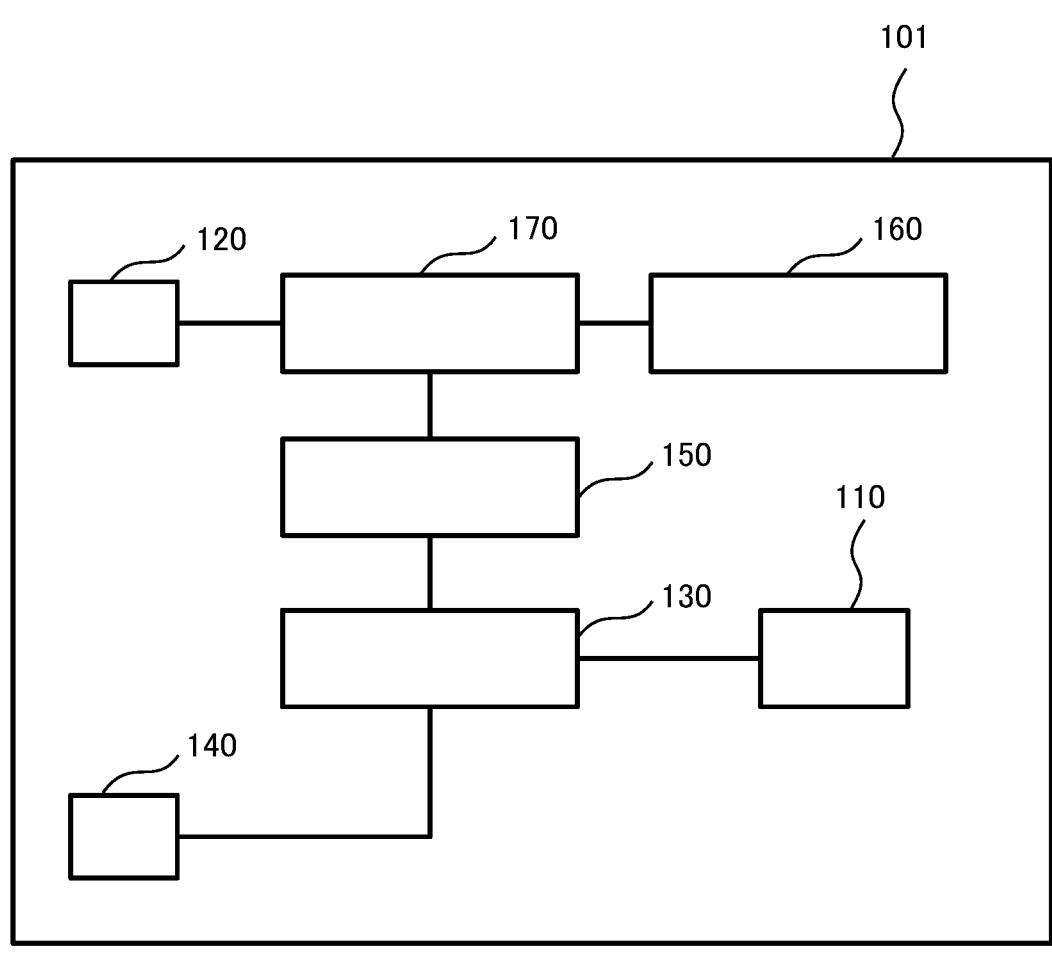
FIG. 2 is a block diagram illustrating another configuration of the optical control device according to the first example embodiment of the present invention.

As illustrated in FIG. 2, an optical control device 101 may have a configuration that further includes a first wavelength selection unit (first wavelength selection means) 150, a second wavelength selection unit (second wavelength selection means) 160, and an optical splitting unit (optical splitting means) 170.

The first wavelength selection unit 150 blocks the signal light, and transmits the test light. The second wavelength selection unit 160 transmits the signal light, and blocks the test light. Further, the optical splitting unit 170 splits any one of the signal light and the test light into two, and delivers the signal light being split or the test light being split to the first wavelength selection unit 150 and the second wavelength selection unit 160.

Each of the first wavelength selection unit 150 and the second wavelength selection unit 160 may be configured to include a bandpass filter. Further, as the first wavelength selection unit 150 and the second wavelength selection unit 160, a wavelength selective switch (WSS) may be used. As the optical splitting unit 170, a coupler may generally be used.

Figure 3:
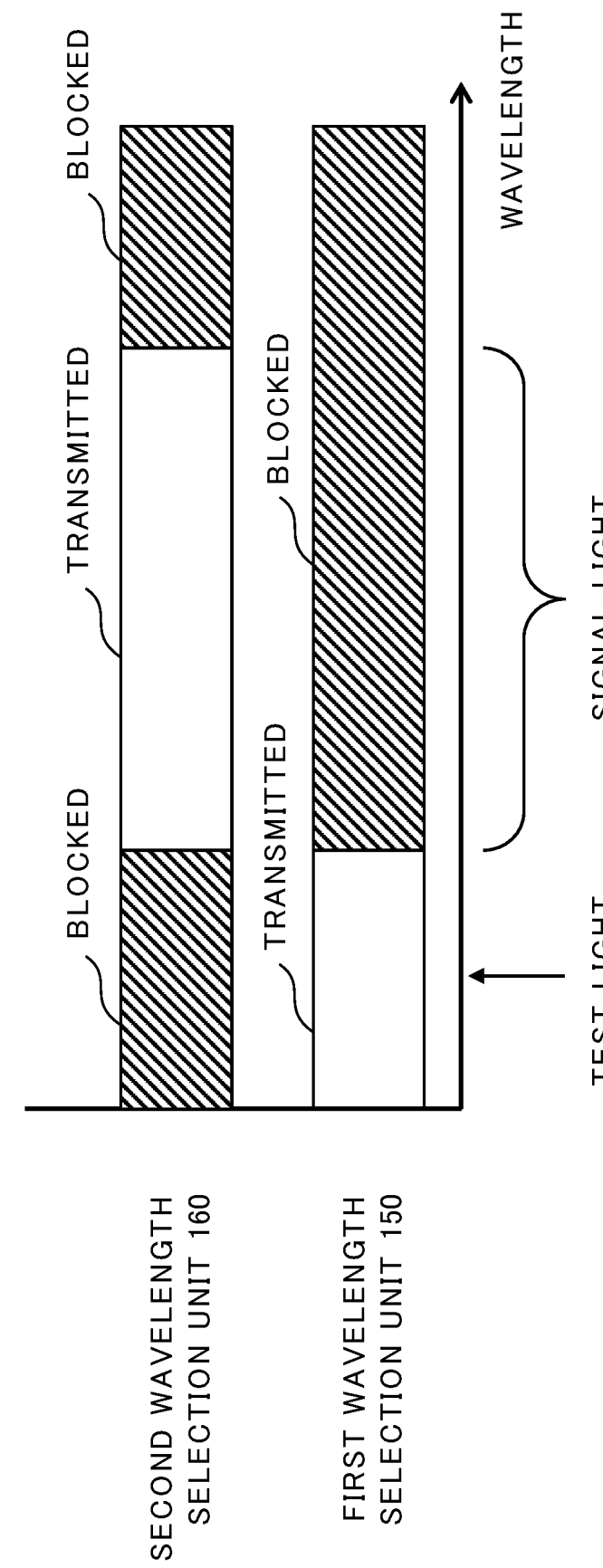
FIG. 3 is a diagram illustrating transmission characteristics of a first wavelength selection unit and a second wavelength selection unit of the optical control device according to the first example embodiment of the present invention.

FIG. 3 illustrates an example of transmission characteristics of the first wavelength selection unit 150 and the second wavelength selection unit 160. As illustrated in the drawing, the test light is transmitted through the first wavelength selection unit 150, and is blocked by the second wavelength selection unit 160. Further, the signal light is blocked by the first wavelength selection unit 150, and is transmitted through the second wavelength selection unit 160.

Figure 4:
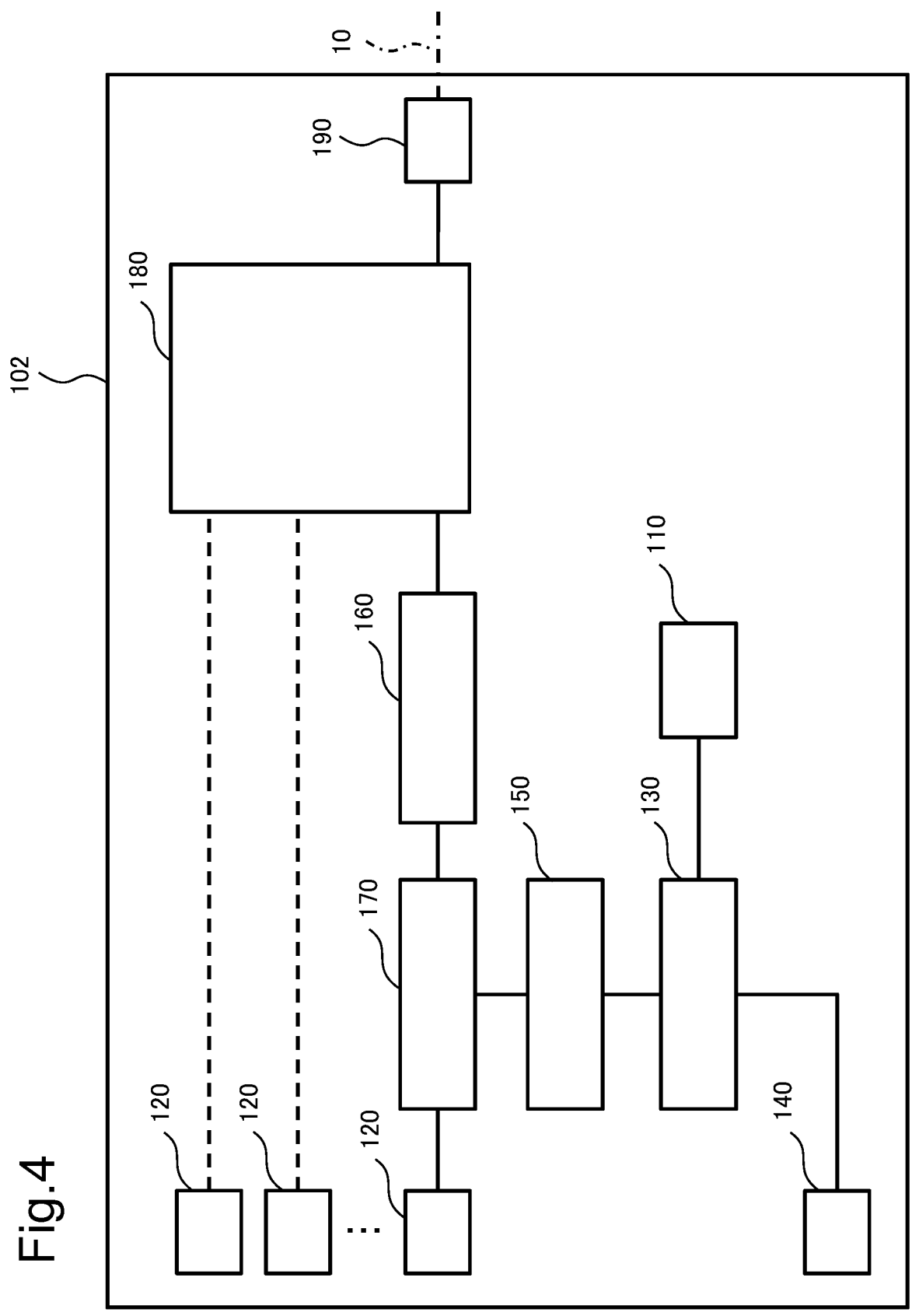
FIG. 4 is a block diagram illustrating another configuration of the optical control device according to the first example embodiment of the present invention.

As illustrated in FIG. 4, an optical control device 102 may have a configuration that further includes an optical multiplexing unit (optical multiplexing means) 180 and a third connection unit (third connection means) 190. FIG. 4 also illustrates the first wavelength selection unit 150, the second wavelength selection unit 160, and the optical splitting unit 170.

The optical multiplexing unit 180 multiplexes a plurality of the signal light received by a plurality of first connection units 120, and generates multiplexed signal light. As the optical multiplexing unit 180, a coupler may generally be used. Further, the third connection unit 190 is configured to deliver the multiplexed signal light to an optical transmission line 10. With this configuration, the optical control device 102 is capable of functioning as a wavelength multiplexing device.

In FIG. 4, only the configuration relating to one first connection unit 120 is described, but the other first connection units 120 each include a configuration similar to that of the optical control device 102 (see FIG. 2).

Figure 5:
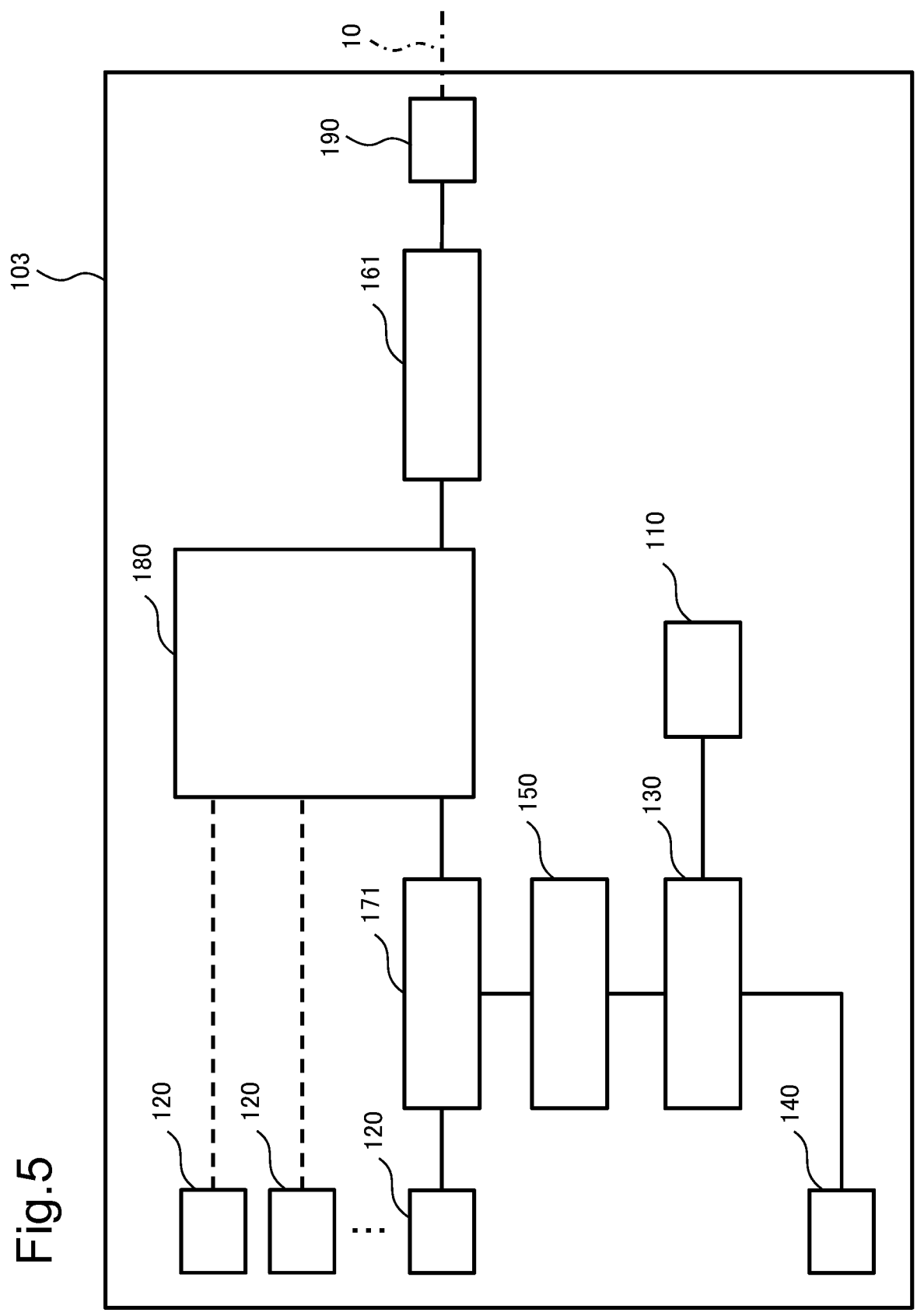
FIG. 5 is a block diagram further illustrating another configuration of the optical control device according to the first example embodiment of the present invention.

Further, as illustrated in FIG. 5, an optical control device 103 may have a configuration that includes the first wavelength selection unit (first wavelength selection means) 150, a third wavelength selection unit (third wavelength selection means) 161, and an optical splitting unit (optical splitting means) 171. Here, the optical control device 103 includes the storage unit 110, the first connection unit 120, the optical modulation unit 130, the second connection unit 140, the optical multiplexing unit 180, and the third connection unit 190, and those units are operated as described above.

The first wavelength selection unit 150 blocks the signal light, and transmits the test light. The third wavelength selection unit 161 transmits the plurality of signal light included in the multiplexed signal light, and blocks the test light. Further, the optical splitting unit 171 splits any one of the signal light and the test light into two, and delivers the signal light being split or the test light being split to the first wavelength selection unit 150 and the optical multiplexing unit 180.

For example, as the third wavelength selection unit 161, an arrayed waveguide grating (AWG) or a wavelength selective switch (WSS) may be used. With this, a comb-shaped filter can be configured. Therefore, according to the optical control device 103, the second wavelength selection unit 160 (see FIG. 4) provided to each of the first connection units 120 can be collected as a block unit by one third wavelength selection unit 161.

As described above, the optical control devices 100, 101, 102, and 103 according to the present example embodiment can reduce a burden for configurating optical transmission equipment in an optical transmission system.

Second Example Embodiment

Figure 6:
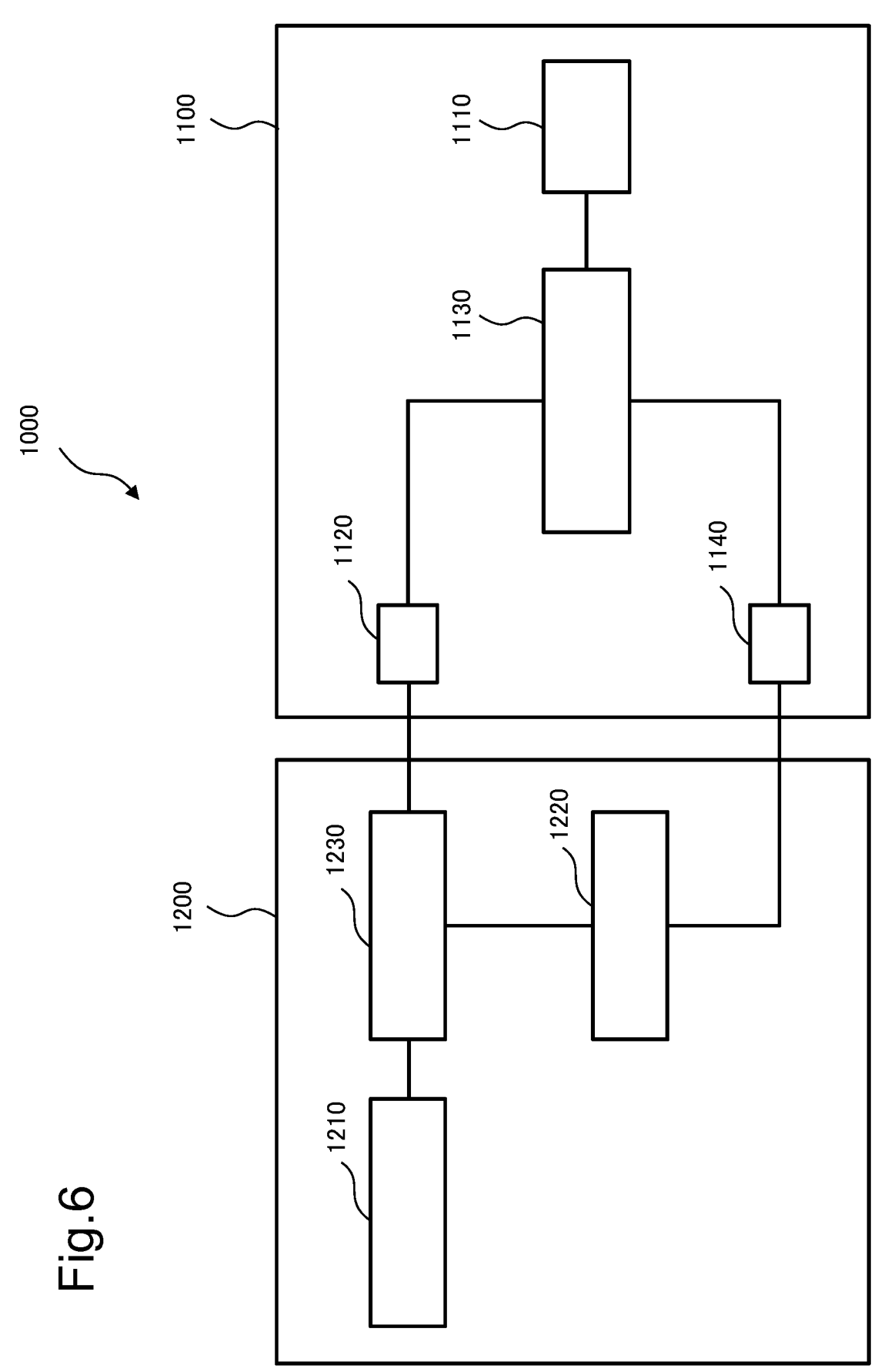
FIG. 6 is a block diagram illustrating a configuration of an optical transmission device according to a second example embodiment of the present invention.

Next, a second example embodiment of the present invention is described. FIG. 6 illustrates a configuration of an optical transmission device 1000 according to the present example embodiment. The optical transmission device 1000 includes an optical control device 1100 and an optical sending device 1200. The optical transmission device 1000 is suitably used in an optical transmission system such as a submarine optical transmission system.

As the optical control device 1100, any one of the optical control devices 100, 101, 102, and 103 according to the first example embodiment may be used. In other words, the optical control device 1100 at least includes a storage unit 1110, a first connection unit 1120, an optical modulation unit 1130, and a second connection unit 1140.

The storage unit 1110 is configured to store transmission characteristics information in advance, the transmission characteristics information relating to an optical transmission system that transmits signal light via an optical transmission line. The first connection unit 1120 is configured to receive signal light and test light having a wavelength different from that of the signal light. The optical modulation unit 1130 is configured to modulate the test light by using the transmission characteristics information and generate test modulation light. Further, the second connection unit 1140 is configured to transmit the test modulation light.

The optical sending device 1200 includes a wavelength variable light generation unit (wavelength variable light generation means) 1210, a transmission information acquisition unit (transmission information acquisition means) 1220, and a signal light generation unit (signal light generation means) 1230.

The wavelength variable light generation unit 1210 generates the test light and continuous light having a wavelength different from that of the test light in a switching manner. The transmission information acquisition unit 1220 receives the test modulation light, and acquires the transmission characteristics information from the test modulation light. Further, the signal light generation unit 1230 controls the continuous light by using setting information associated with the transmission characteristics information, and generates the signal light.

In this manner, in the optical transmission device 1000, the optical control device 1100 is configured to modulate the test light by using the transmission characteristics information relating to the optical transmission system, generate the test modulation light, and deliver the test modulation light to the optical sending device 1200. Thus, the optical sending device 1200 is capable of performing configuration associated with the transmission characteristics information by using the transmission characteristics information. Therefore, it is not required for a maintenance person to manually perform configuration for the optical sending device 1200. In other words, the optical transmission device 1000 of the present example embodiment can reduce a burden for configurating optical transmission equipment in an optical transmission system.

As the wavelength variable light generation unit 1210, a variable wavelength light source (tunable laser diode) may generally be used. The variable wavelength light source is capable of outputting laser light (continuous light) having different wavelengths according to the setting.

The transmission information acquisition unit 1220 may have a configuration that includes an optical demodulator. The optical demodulator demodulates the test modulation light in which the optical modulation unit 1130 superposes the transmission characteristics information through intensity modulation. Further, the setting information includes at least one of a wavelength, power, a modulation technique, and a baud rate of the signal light.

Figure 7:
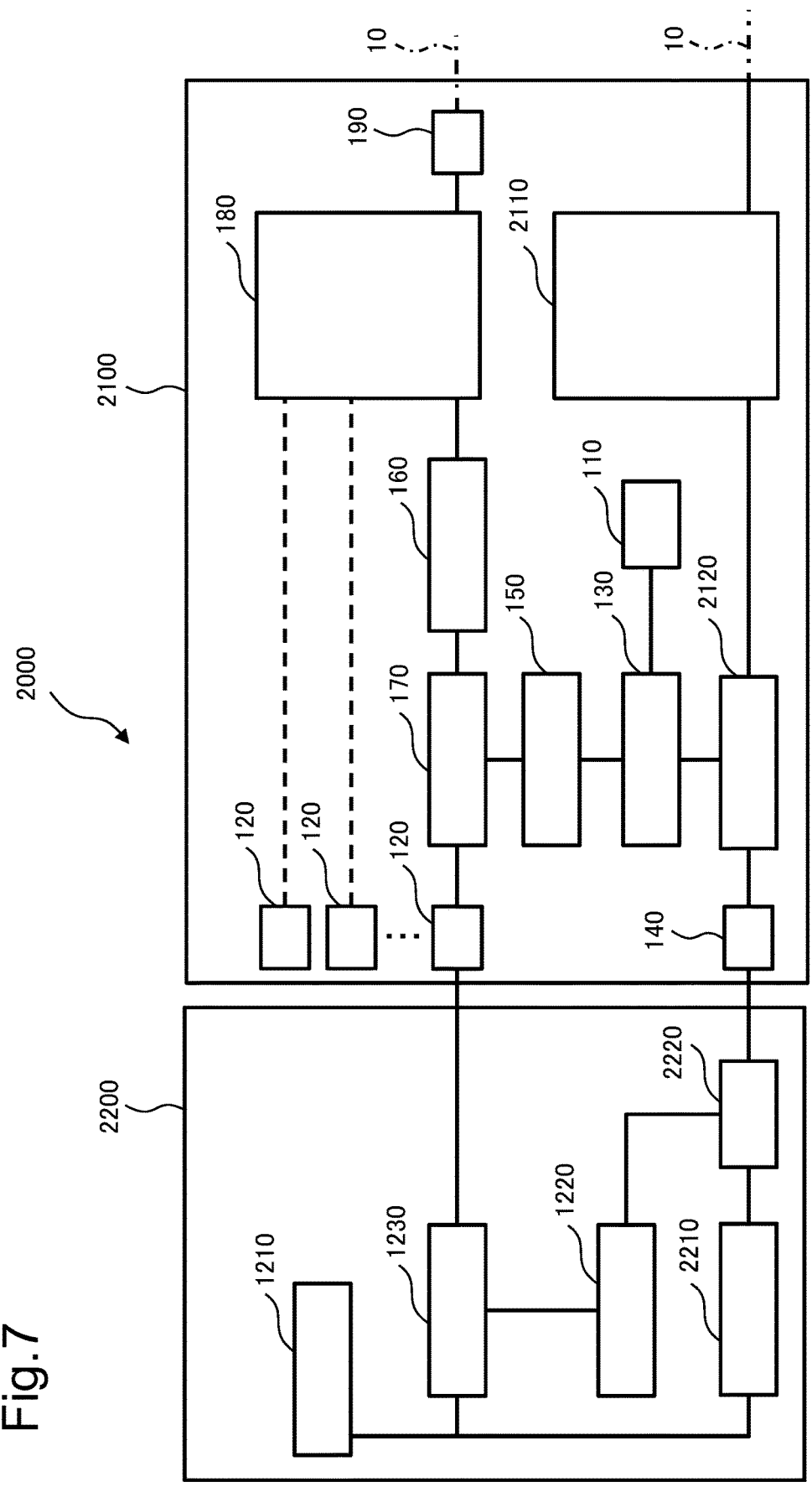
FIG. 7 is a block diagram illustrating another configuration of the optical transmission device according to the second example embodiment of the present invention.

Next, the optical transmission device according to the present example embodiment is described further in detail by using an optical transmission device 2000 illustrated in FIG. 7. The optical transmission device 2000 includes a wavelength multiplexing unit 2100 and a transponder 2200.

The wavelength multiplexing unit 2100 is configured to further include a splitting filter 2110 and a multiplexing coupler 2120, in addition to the configuration of the optical control device 102 according to the first example embodiment (see FIG. 4). The splitting filter 2110 splits wavelength multiplexing (WDM) signal light that is input from the optical transmission line 10, according to a wavelength of the transponders 2200, and distributes the resultant light to the second connection unit 140. The multiplexing coupler 2120 multiplexes output light from the splitting filter 2110 and the optical modulation unit 130.

The transponder 2200 is configured to further include an optical reception device 2210 and a splitting coupler 2220, in addition to the configuration of the optical sending device 1200 (see FIG. 6). The optical reception device 2210 receives and demodulates the WDM signal light from the wavelength multiplexing unit 2100. FIG. 7 illustrates a configuration of a coherent reception method in which laser light output from the wavelength variable light generation unit 1210 is used as local oscillation light. The splitting coupler 2220 splits the WDM signal light that is output from the wavelength multiplexing unit 2100, and distributes the resultant light to the optical reception device 2210 and the transmission information acquisition unit 1220.

In this manner, in the optical transmission device 2000, a transmission parameter (transmission characteristics information) of each port (the first connection unit 120) is registered in advance in the wavelength multiplexing unit 2100. Further, there is adopted a configuration in which the wavelength multiplexing unit 2100 notifies the transponder 2200 of the transmission parameter (transmission characteristics information) when the transponder 2200 is connected to the wavelength multiplexing unit 2100 with a patch code. Thus, it is not required for a maintenance person to register setting information manually or by using a network management system (NMS). In other words, configuration for the transponder 2200 can be performed automatically.

Subsequently, an operation of the optical transmission device 2000 according to the present example embodiment is described.

Figure 8:
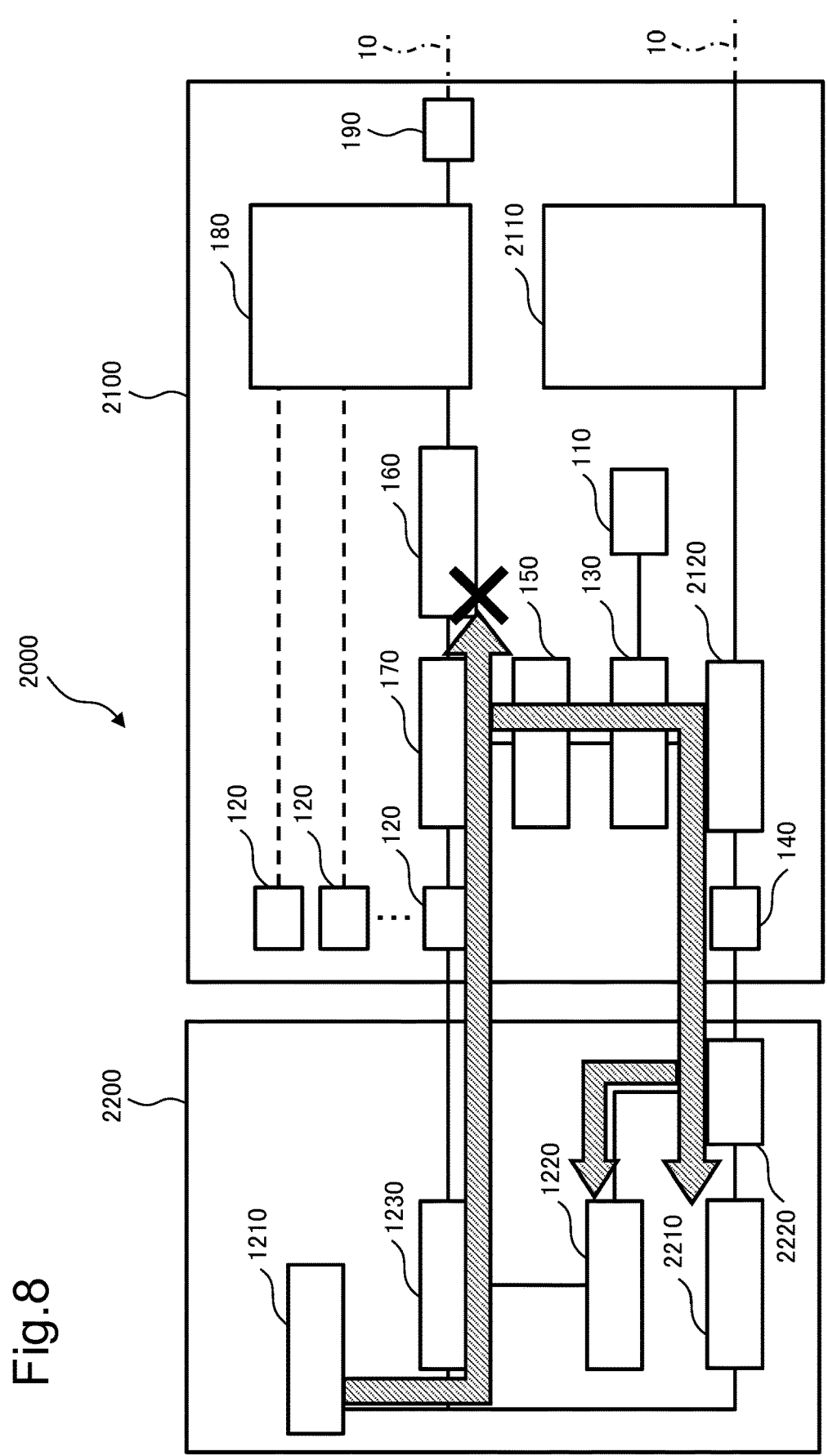
FIG. 8 is a diagram for describing an operation of the optical transmission device according to the second example embodiment of the present invention.

At the time of activation, the transponder 2200 causes the wavelength variable light generation unit 1210 to emit light at a wavelength of the test light. A path of the test light in this state is illustrated in FIG. 8. The test light that is output from the wavelength variable light generation unit 1210 is input from the first connection unit 120 to the wavelength multiplexing unit 2100 via the signal light generation unit 1230. The test light that is input to the wavelength multiplexing unit 2100 is split by the optical splitting unit 170, and is input to the first wavelength selection unit 150 and the second wavelength selection unit 160. However, the second wavelength selection unit 160 blocks the test light, and hence the test light is not input to the optical multiplexing unit 180. Meanwhile, the first wavelength selection unit 150 transmits the test light. Thus, the test light is superposed on the transmission characteristics information through, for example, intensity modulation by the optical modulation unit 130, and is output from the second connection unit 140.

The test light that is output from the second connection unit 140 is split by the splitting coupler 2220, and is input to the transmission information acquisition unit 1220. The transmission characteristics information that is superposed by the optical modulation unit 130 is decoded by the transmission information acquisition unit 1220. With this, the transponder 2200 acquires the transmission characteristics information, performs configuration for the wavelength variable light generation unit 1210, based on an output wavelength, output power, a modulation technique, a baud rate, or the like that is optimized for the transmission characteristics information, and starts the operation.

Figure 9:
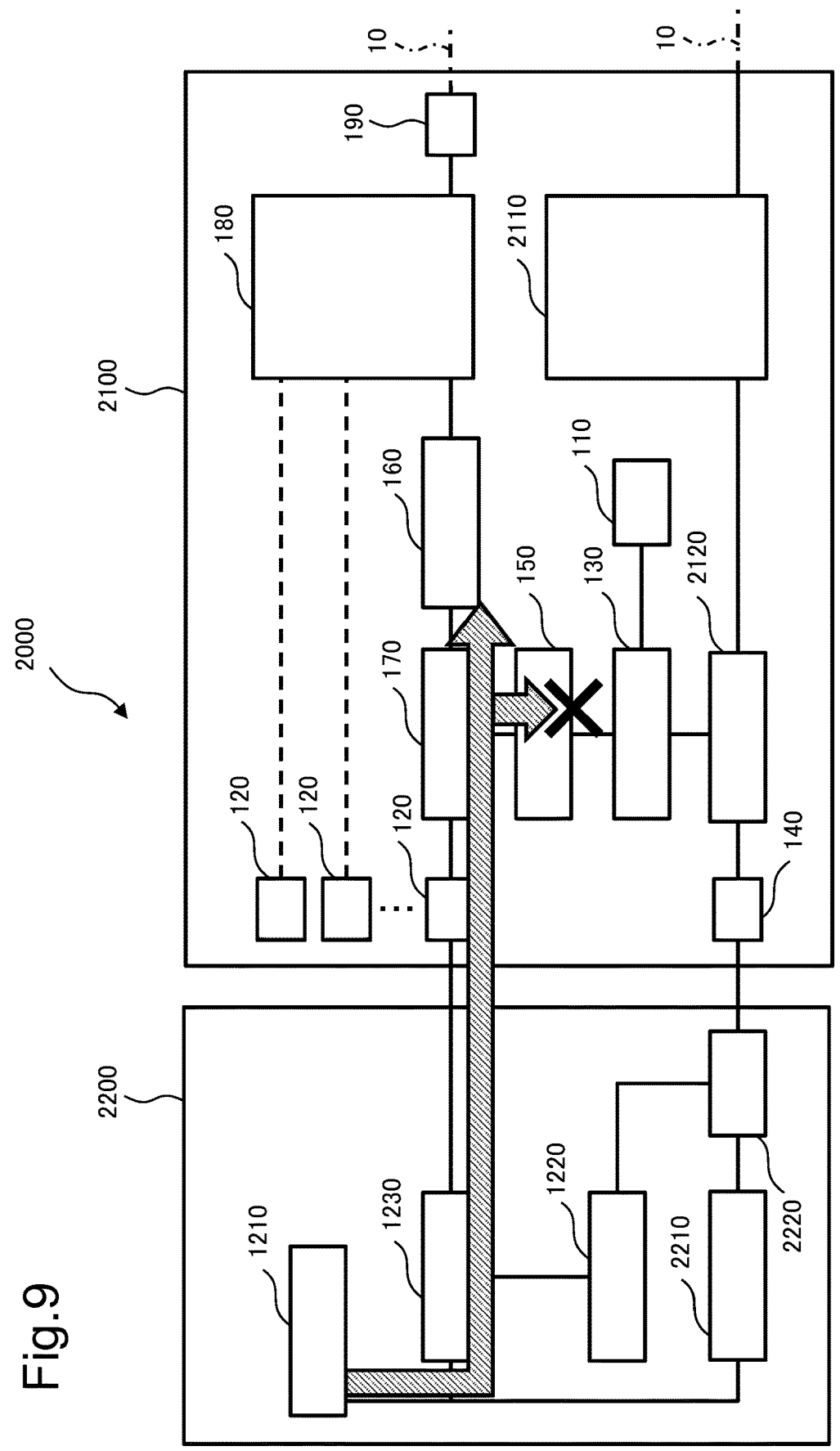
FIG. 9 is a diagram for describing another operation of the optical transmission device according to the second example embodiment of the present invention.

FIG. 9 illustrates a path of the signal light after configuration is completed. The continuous light that is output from the wavelength variable light generation unit 1210 is modulated by the signal light generation unit 1230 to the signal light that is optimized for the optical transmission line 10, and is input from the first connection unit 120 to the wavelength multiplexing unit 2100.

The signal light that is input to the wavelength multiplexing unit 2100 is split by the optical splitting unit 170, and is input to the first wavelength selection unit 150 and the second wavelength selection unit 160. However, the first wavelength selection unit 150 blocks the signal light, and hence the signal light is not output to the optical modulation unit 130. The signal light that is transmitted through the second wavelength selection unit 160 is wavelength-multiplexed with the signal light of another transponder by the optical multiplexing unit 180, and is output to the optical transmission line 10.

In this manner, in the optical transmission device 2000, the transmission characteristics information such as a wavelength or a usable band that is allocated for each connection port and a type or a transmission distance of an optical transmission cable is registered in advance in the wavelength multiplexing unit 2100. Further, when the transponder 2200 is connected to a transponder connection port of the wavelength multiplexing unit 2100, the wavelength multiplexing unit 2100 superposes the transmission characteristics information on the test light that is output from the transponder 2200, through intensity modulation, and sends the resultant to the transponder 2200.

At the time of activation, the transponder 2200 outputs the test light to the wavelength multiplexing unit 2100. The transponder 2200 acquires the transmission characteristics information relating to the optical transmission system by demodulating the test modulation light that is acquired by subjecting the test light to intensity modulation by the wavelength multiplexing unit 2100 and is sent back from the wavelength multiplexing unit 2100. Further, the transponder 2200 performs configuration for itself with a wavelength, a modulation technique, and output power based on the transmission characteristics information.

As described above, in the optical transmission devices 1000 and 2000 of the present example embodiment, the transponder 2200 recognizes the port of the wavelength multiplexing unit to which the transponder 2200 is connected, and is automatically activated. Thus, work for additionally providing a transponder using a new wavelength can be performed by a less trained maintenance person.

Further, the transponder starts operating with settings optimized for the port of the wavelength multiplexing unit being connected thereto, and hence any impact on operational lines due to incorrect connections can be avoided. In this case, there is no need for a confirmation procedure for preventing incorrect connections, and hence the number of steps in additional installation work can be reduced.

Moreover, according to the optical transmission devices 1000 and 2000 of the present example embodiment, the patch can be changed simply by changing the port of the wavelength multiplexing unit to which the transponder is connected. Thus, when switching of the path is required due to a failure in the optical transmission line or the like, the path can be changed without changing the settings from a monitoring device or the like.

Figure 10:
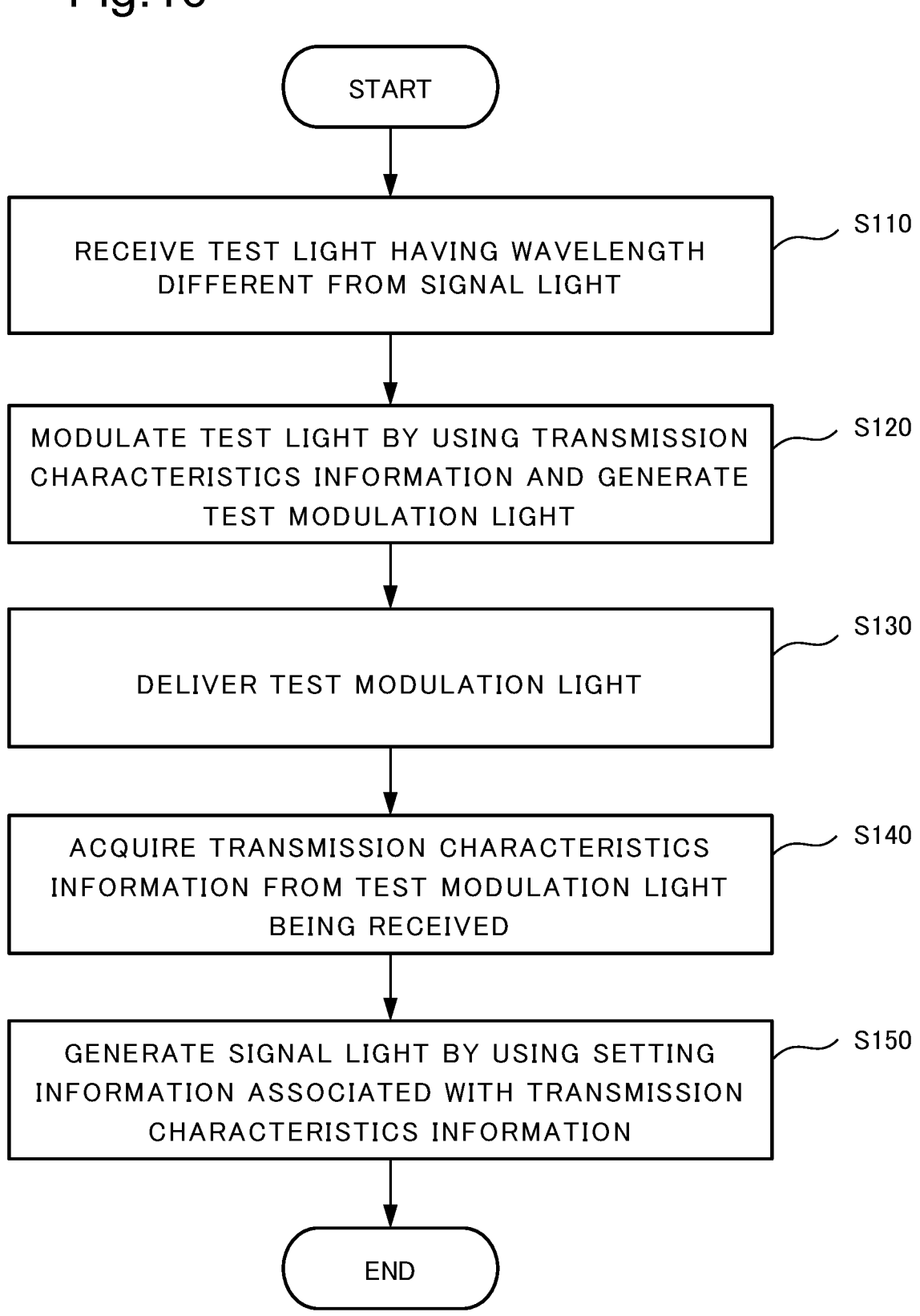
FIG. 10 is a flowchart for describing a signal light setting method according to the second example embodiment of the present invention.

Next, with reference to a flowchart illustrated in FIG. 10, a signal light setting method according to the present example embodiment is described.

In the signal light setting method of the present example embodiment, first, the test light having a wavelength different from the signal light is received (step S110). Further, the test light is modulated by using the transmission characteristics information, and the test modulation light is generated (step S120). Here, the transmission characteristics information is information relating to an optical transmission system that transmits signal light via an optical transmission line. Subsequently, the test modulation light is delivered (step S130).

Next, the transmission characteristics information is acquired from the test modulation light being received (step S140). Further, the continuous light having a wavelength different from that of the test light is controlled by using the setting information associated with the transmission characteristics information, and the signal light is generated (step S150).

In this manner, in the signal light setting method according to the present example embodiment, the test light is modulated by using the transmission characteristics information to generate the test modulation light, the transmission characteristics information is acquired from the test modulation light being received, and the signal light is generated by using the setting information associated with the transmission characteristics information. Thus, when the signal light is generated, configuration associated with the transmission characteristics information can be performed automatically. Therefore, it is not required for a maintenance person to manually perform configuration for generating the signal light. In other words, the signal light setting method of the present example embodiment can reduce a burden for configurating optical transmission equipment in an optical transmission system.

Here, there may be adopted a configuration that further includes generating the multiplexed signal light by multiplexing the plurality of signal light and delivering the multiplexed signal light to the optical transmission line. In this state, the plurality of signal light included in the multiplexed signal light can be transmitted, and the test light can be blocked.

Generating the test modulation light may include splitting the test light, transmitting one part of the test light being split, modulating the test light being transmitted, and blocking another part of the test light being split.

Further, generating the test modulation light may include superposing the transmission characteristics information on the test light by subjecting the test light to intensity modulation. In this state, acquiring the transmission characteristics information may include demodulating the test modulation light in which the transmission characteristics information is superposed by subjecting the test light to intensity modulation.

The transmission characteristics information described above includes at least one of a wavelength allocated for receiving the signal light, a usable band allocated for receiving the signal light, a type of the optical transmission line, and a transmission distance of the optical transmission line. Further, the setting information described above includes at least one of a wavelength, power, a modulation technique, and a baud rate of the signal light.

As described above, the optical transmission devices 1000 and 2000 and the signal light setting method according to the present example embodiment can reduce a burden for configurating optical transmission equipment in an optical transmission system.

The whole or part of the example embodiments disclosed above can be described as, but not limited to, the following supplementary notes.

(Supplementary Note 1) An optical control device including: a storage means for storing transmission characteristics information in advance, the transmission characteristics information relating to an optical transmission system that transmits signal light via an optical transmission line; a first connection means for receiving the signal light and test light having a wavelength different from that of the signal light; an optical modulation means for modulating the test light using the transmission characteristics information and generating test modulation light; and a second connection means for delivering the test modulation light.

(Supplementary Note 2) The optical control device according to Supplementary Note 1, further including: an optical multiplexing means for multiplexing a plurality of pieces of the signal light received by a plurality of the first connection means and generating multiplexed signal light; and a third connection means for delivering the multiplexed signal light to the optical transmission line.

(Supplementary Note 3) The optical control device according to Supplementary Note 1 or 2, further including: a first wavelength selection means for blocking the signal light and transmitting the test light; a second wavelength selection means for transmitting the signal light and blocking the test light; and an optical splitting means for splitting any one of the signal light and the test light and delivering the split light to the first wavelength selection means and the second wavelength selection means.

(Supplementary Note 4) The optical control device according to Supplementary Note 2, further including: a first wavelength selection means for blocking the signal light and transmitting the test light; a third wavelength selection means for transmitting the plurality of pieces of signal light contained in the multiplexed signal light, and blocking the test light; and an optical splitting means for splitting any one of the signal light and the test light and delivering the split light to the first wavelength selection means and the optical multiplexing means.

(Supplementary Note 5) The optical control device according to any one of Supplementary Notes 1, 2, and 4, wherein the light modulation means includes an optical modulator configured to superpose the transmission characteristics information on the test light by subjecting the test light to intensity modulation.

(Supplementary Note 6) The optical control device according to any one of Supplementary Notes 1, 2, and 4, wherein the transmission characteristics information includes at least one of a wavelength allocated to the first connection means, a usable band allocated to the first connection means, a type of the optical transmission line, and a transmission distance of the optical transmission line.

(Supplementary Note 7) An optical transmission device including: the optical control device according to any one of Supplementary Notes 1, 2, and 4; and an optical sending device, wherein the optical sending device includes: a wavelength variable light generation means for generating the test light and continuous light having a wavelength different from that of the test light in a switching manner; a transmission information acquisition means for receiving the test modulation light and acquiring the transmission characteristics information from the test modulation light; and a signal light generation means for controlling the continuous light by using setting information associated with the transmission characteristics information and generating the signal light.

(Supplementary Note 8) The optical transmission device according to Supplementary Note 7, wherein the transmission information acquisition means includes an optical demodulator configured to demodulate the test modulation light on which the light modulation means superposes the transmission characteristics information through intensity modulation.

(Supplementary Note 9) The optical transmission device according to Supplementary Note 7, wherein the setting information includes at least one of a wavelength, power, a modulation technique, and a baud rate of the signal light.

(Supplementary Note 10) A signal light setting method including: receiving test light having a wavelength different from that of signal light; modulating the test light by using transmission characteristics information relating to an optical transmission system that transmits the signal light via an optical transmission line, and generating test modulation light; delivering the test modulation light; acquiring the transmission characteristics information from the test modulation light being received; and controlling continuous light having a wavelength different from that of the test light by using setting information associated with the transmission characteristics information, and generating the signal light.

(Supplementary Note 11) The signal light setting method according to Supplementary Note 10, further including multiplexing a plurality of pieces of the signal light and generating multiplexed signal light, and delivering the multiplexed signal light to the optical transmission line.

(Supplementary Note 12) The signal light setting method according to Supplementary Note 10 or 11, wherein the generating the test modulation light includes splitting the test light, transmitting one part of the test light being split, modulating the test light being transmitted, and blocking another part of the test light being split.

(Supplementary Note 13) The signal light setting method according to Supplementary Note 11, further including transmitting the plurality of pieces of signal light included in the multiplexed signal light, and blocking the test light.

(Supplementary Note 14) The signal light setting method according to any one of Supplementary Notes 10, 11, and 13, wherein the generating the test modulation light includes superposing the transmission characteristics information on the test light by subjecting the test light to intensity modulation.

(Supplementary Note 15) The signal light setting method according to Supplementary Note 14, wherein the acquiring the transmission characteristics information includes demodulating the test modulation light on which the transmission characteristics information is superposed by subjecting the test light to intensity modulation.

(Supplementary Note 16) The signal light setting method according to any one of Supplementary Notes 10, 11, and 13, wherein the transmission characteristics information includes at least one of a wavelength allocated for receiving the signal light, a usable band allocated for receiving the signal light, a type of the optical transmission line, and a transmission distance of the optical transmission line.

(Supplementary Note 17) The signal light setting method according to any one of Supplementary Notes 10, 11, and 13, wherein the setting information includes at least one of a wavelength, power, a modulation technique, and a baud rate of the signal light.

(Supplementary Note 18) An optical sending device including: a wavelength variable light generation means for generating test light and continuous light having a wavelength different from that of the test light in a switching manner; a transmission information acquisition means for receiving test modulation light and acquiring transmission characteristics information from the test modulation light, the test modulation light being acquired by modulating the test light by using the transmission characteristics information relating to an optical transmission system that transmits signal light via an optical transmission line; and a signal light generation means for controlling the continuous light by using setting information associated with the transmission characteristics information, and generating the signal light.

(Supplementary Note 19) The optical sending device according to Supplementary Note 18, wherein the transmission information acquisition means includes an optical demodulator configured to demodulate the test modulation light on which the transmission characteristics information is superposed by subjecting the test light to intensity modulation.

(Supplementary Note 20) The optical sending device according to Supplementary Note 18 or 19, wherein the setting information includes at least one of a wavelength, power, a modulation technique, and a baud rate of the signal light.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An optical control device comprising:

a storage configured to store transmission characteristics information in advance, the transmission characteristics information relating to an optical transmission system that transmits signal light via an optical transmission line;

a first connector configured to receive the signal light and test light having a wavelength different from that of the signal light;

an optical modulator configured to modulate the test light by using the transmission characteristics information, and generating test modulation light;

a second connector configured to deliver the test modulation light;

an optical multiplexing module configured to multiplex a plurality of pieces of the signal light received by a plurality of the first connector and to generate multiplexed signal light; and a third connector configured to deliver the multiplexed signal light to the optical transmission line.

2. The optical control device according to claim 1, further comprising:

a first wavelength selector configured to deliver the signal light and transmitting the test light;

a second wavelength selector configured to transmit the signal light and to block the test light; and an optical splitter configured to split any one of the signal light and the test light and to deliver the split light to the first wavelength selector and the second wavelength selector.

3. The optical control device according to claim 1, further comprising:

a first wavelength selector configured to block the signal light and to transmit the test light;

a third wavelength selector configured to transmit the plurality of pieces of signal light contained in the multiplexed signal light, and to block the test light; and an optical splitter configured to split any one of the signal light and the test light and to deliver the split light to the first wavelength selector and the second wavelength selector.

4. The optical control device according to claim 1, wherein the optical modulator includes an optical modulator configured to superpose the transmission characteristics information on the test light by subjecting the test light to intensity modulation.

5. The optical control device according to claim 1, wherein the transmission characteristics information includes at least one of a wavelength allocated to the first connector, a usable band allocated to the first connector, a type of the optical transmission line, and a transmission distance of the optical transmission line.

6. An optical transmission device comprising:

the optical control device according to claim 1; and an optical sending device, wherein the optical sending device is configured to perform:

generating the test light and continuous light having a wavelength different from that of the test light in a switching manner;

receiving the test modulation light and acquiring the transmission characteristics information from the test modulation light; and controlling the continuous light by using setting information associated with the transmission characteristics information, and generating the signal light.

7. The optical transmission device according to claim 6, wherein the optical sending device includes an optical demodulator configured to demodulate the test modulation light on which the optical modulator superposes the transmission characteristics information through intensity modulation.

8. The optical transmission device according to claim 6, wherein the setting information includes at least one of a wavelength, power, a modulation technique, and a baud rate of the signal light.

9. A signal light setting method comprising:

receiving test light having a wavelength different from that of signal light;

modulating the test light by using transmission characteristics information relating to an optical transmission system that transmits the signal light via an optical transmission line, and generating test modulation light;

delivering the test modulation light;

acquiring the transmission characteristics information from the test modulation light being received; and controlling continuous light having a wavelength different from that of the test light by using setting information associated with the transmission characteristics information, and generating the signal light.

10. An optical control device comprising:

a storage configured to store transmission characteristics information in advance, the transmission characteristics information relating to an optical transmission system that transmits signal light via an optical transmission line;

a first connector configured to receive the signal light and test light having a wavelength different from that of the signal light;

an optical modulator configured to modulate the test light by using the transmission characteristics information, and to generate test modulation light;

a second connector configured to deliver the test modulation light;

a first wavelength selector configured to deliver the signal light and to transmit the test light;

a second wavelength selector configured to transmit the signal light and block the test light; and an optical splitter configured to split any one of the signal light and the test light and deliver the split light to the first wavelength selector the second wavelength selector.

* * * * *